Aug. 21, 1934.  A. C. RECKER  1,970,624
ADJUSTABLE TELESCOPING SUPPORT
Filed Sept. 2, 1932
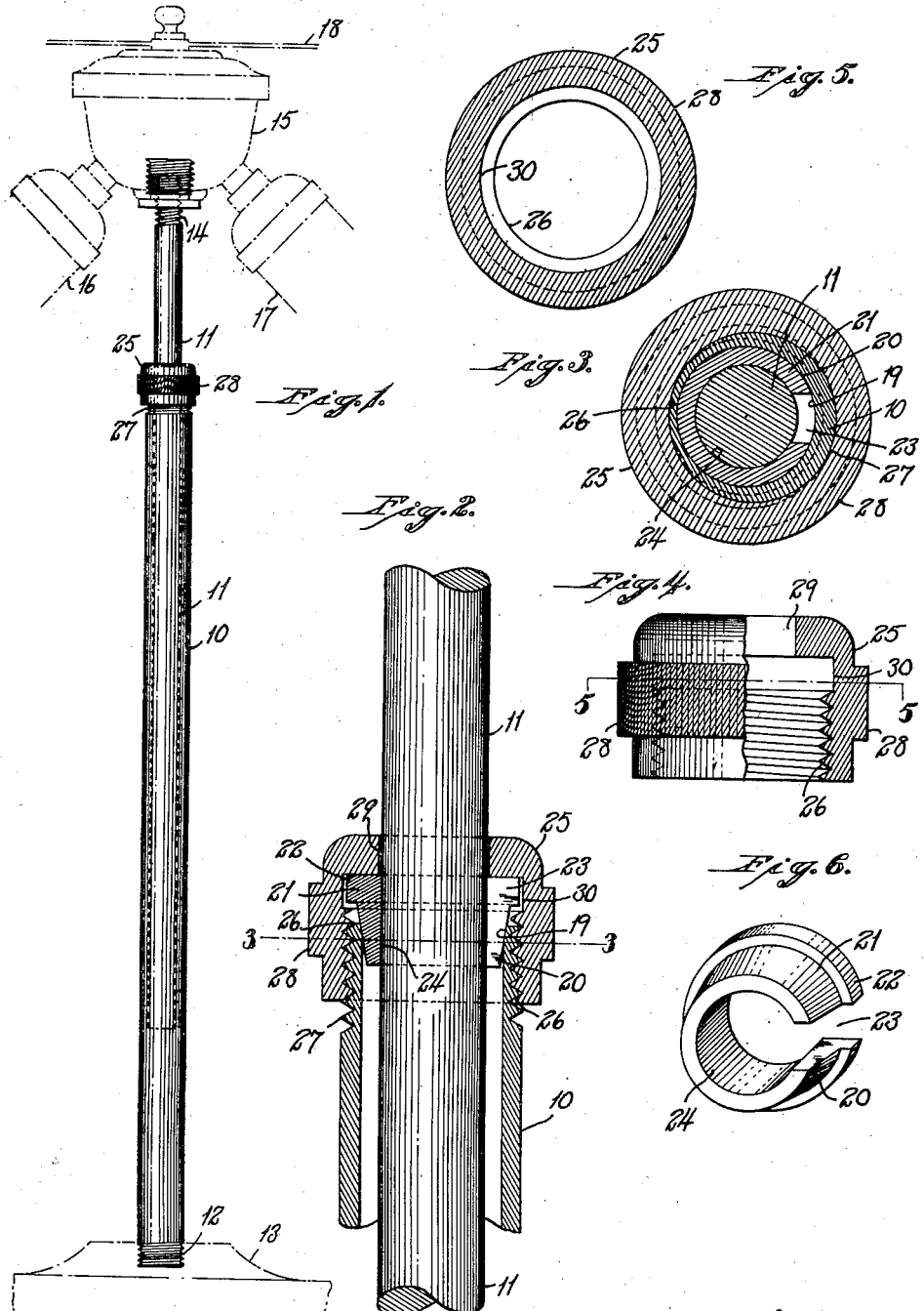

Patented Aug. 21, 1934

1,970,624

UNITED STATES PATENT OFFICE 1,970,624

ADJUSTABLE TELESCOPING SUPPORT

Adolph C. Recker, Oakville, Conn., assignor to The Chase Companies, Incorporated, Waterbury, Conn., a corporation Application September 2, 1932, Serial No. 631,453

1 Claim. (Cl. 248—2)

This invention relates to an improvement in adjustable telescoping supports, such, for instance, as supports employed for adjustably holding the shades and lamp-sockets, etc., of table or floor lamps.

While particularly well suited for supporting shades and lamp-sockets, etc., as above stated, my invention is useful in a wide variety of other situations too numerous to mentioned wherever it may be desired to employ an adjustable telescoping support.

One of the objects of my present invention is to provide at a low cost for manufacture a convenient and reliable adjustable support.

Another object of my invention is to provide an adjustable support in which the clamping device for holding the telescoping members in different positions of adjustment is secure and effective and so constructed and organized as to minimize the likelihood of cramping or failure to release when desired.

A still further object of my invention is to provide a support of the type referred to in which the clamping device is so constructed and organized that its accidental separation is guarded against.

With the foregoing and other objects in view as will appear from the following, my invention consists in an adjustable telescoping support having certain features of construction and combinations and arrangements of parts as will be hereinafter set forth and recited in the claim.

In the accompanying drawing:

Fig. 1 is a view in side elevation of one form which an adjustable telescoping support may assume in accordance with my invention, a base and a lamp-and-shade-supporting head being shown by broken lines in conjunction therewith;

Fig. 2 is a broken view thereof on a larger scale, partly in side elevation and partly in longitudinal section;

Fig. 3 is a transverse sectional view taken on the line 3—3 of Fig. 2;

Fig. 4 is a view partly in side elevation and partly in longitudinal section of the clamping-nut;

Fig. 5 is a transverse sectional view thereof taken on the line 5—5 of Fig. 4; and Fig. 6 is a perspective view of the clamping-ring detached.

The adjustable telescoping support herein chosen for the illustration of my invention includes, as shown, a tubular support member 10 within which a complementary, telescoping rod or support member 11 is adapted to slide, as will hereinafter appear. The lower end of the tubular member 10 is preferably externally threaded as at 12 for being coupled to any desired article, such, for instance, as the lamp-base 13 indicated by broken lines in Fig. 1. The upper end of the rod member 11 is also preferably threaded as at 14 for connection to any suitable article, such, for instance, as a lamp-and-shade-holding head 15 indicated by broken lines in Fig. 1. As shown, the head just referred to carries two or more lamp-sockets 16—17 and has secured to its upper end a shade 18 of any approved type.

Preferably, the inner edge of the upper end of the tubular member 10 is provided with an internal, outwardly-flared, conically-contoured seat 19 with which is adapted to engage the externally conically-contoured periphery of the sleeve-portion 20 of a clamping-ring 21, which latter also includes an outwardly-extending interlocking projection in the form of a substantially annular flange 22.

The clamping-ring 21 before referred to is split as at 23 and its bore 24 is adapted to receive and on occasion snugly grip the rod member 11, as will hereinafter appear.

For the purpose of seating the clamping-ring 21 upon the seat 19 in the tubular member 10, so as to cause the said ring to grip the rod member 11 and frictionally lock the same in adjusted relationship with respect to the tubular member 10, I employ a cup-shaped clamping-nut 25 having internal threads 26 engaging with external threads 27 formed upon the periphery of the tubular member 10 adjacent the upper end thereof, as clearly shown in Fig. 2. The said clamping-nut 25 is preferably formed with a knurled annular bead 28 by means of which it may be conveniently turned by the fingers and is also provided with an axial passage 29 through which the rod member is adapted to freely pass.

For the purpose of organizing the clamping-ring 21 and the clamping-nut 25 into a unitary structure and thus prevent their accidental separation, the said clamping-nut is formed immediately above its threads 26 with an undercut annular interlocking recess 30 into which the interlocking flange 22 of the clamping-ring 21 projects with freedom for relative rotary movement, when the parts are assembled as shown in Fig. 2.

As the internal seat 19 and the external thread 27 lie between the imaginary surfaces formed by axially projecting the inner and outer cylindrical surfaces of the tubular support-member 10, the latter can be made from ordinary standard pipe or tubing.

The split 23 in the clamping-ring 21 is of sufficient width to permit the said ring to be contracted for its introduction through the under face of the nut until its interlocking flange 22 is aligned with the interlocking recess 30 in the latter. Upon being positioned as just described and the contracting tension removed from it, the clamping-ring 21 will expand under its own tension so as to interlock its flange 22 with the said recess 30 and thus more or less permanently assemble the said ring and the said nut together with capacity for relative rotation with respect to each other.

When the clamping-nut 25 is screwed firmly onto the end of the tubular member 10, it will force the conical surface 20 of the clamping-ring 21 into engagement with the seat 19 of the said tubular member 10 with the effect of causing a contraction of the said ring until the surface of its axial bore 24 firmly grips the periphery of the rod member 11 to thus lock the same in any desired position of adjustment with respect to the tubular member 10. Upon the backing off of the clamping-nut 25 the grip of the clamping-ring 21 upon the rod member 11 will be released and the said rod member may be moved longitudinally to any other desired position of adjustment.

It will be understood by those skilled in the art that my invention may assume varied physical forms without departing from my inventive concept, and I, therefore, do not limit my invention to the specific embodiment herein chosen for illustration, but only as indicated in the appended claim.

I claim:

A device of the class described comprising: a tubular support-member externally threaded at one end and provided with an internal, outwardly-flared, conically-contoured seat at said threaded end; the internal and external diameters of said tubular member, respectively, being substantially uniform throughout, the major length of said tubular support-member extending back respectively from directly adjacent said internal seat and said external thread; said internal seat and said external thread lying between the imaginary surfaces formed by axially projecting the inner and outer surfaces of said tubular support-member adjacent said threaded end; a complementary telescoping support-member arranged substantially coaxially with said tubular support-member and having its outer surface of substantially uniform diameter and adjustably extending thereinto; a clamping-nut threadedly connected to said externally-threaded end of said tubular support-member and having an interior interlocking recess; and a split clamping-ring having an externally conically-contoured surface cooperating with said seat and causing said clamping-ring to frictionally grip the said telescoping support-member and having an interlocking flange engaged with the interlocking recess in the said clamping-nut to interlock the clamping-nut and clamping-ring against axial separation.

ADOLPH C. RECKER.